Oct. 13, 1925.

B. L. NEWKIRK 1,557,268

PROCESS OF AND APPARATUS FOR BALANCING ROTATIVE BODIES

Filed July 23, 1920

Inventor
BURT L. NEWKIRK

By Paul & Paul
His Attorneys

Oct. 13, 1925.
B. L. NEWKIRK
1,557,268
PROCESS OF AND APPARATUS FOR BALANCING ROTATIVE BODIES
Filed July 23, 1920    3 Sheets-Sheet 2
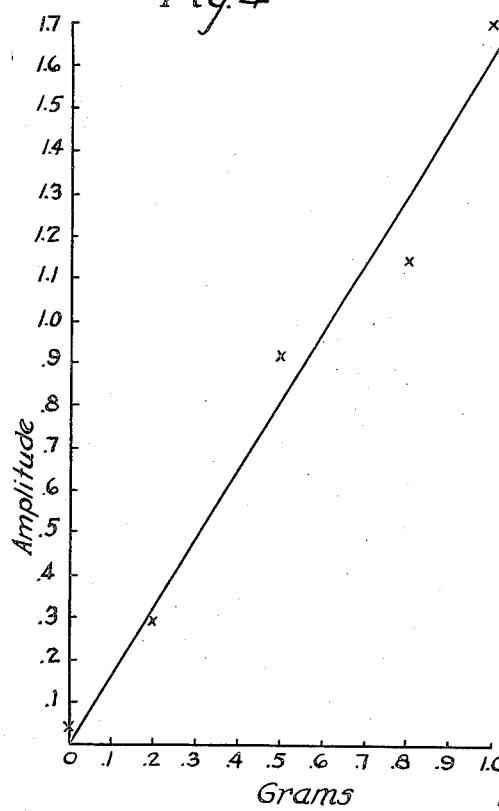
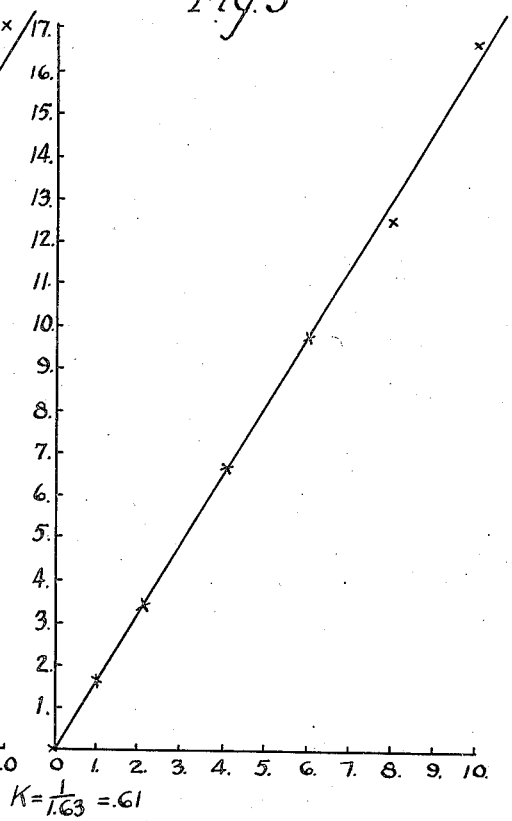
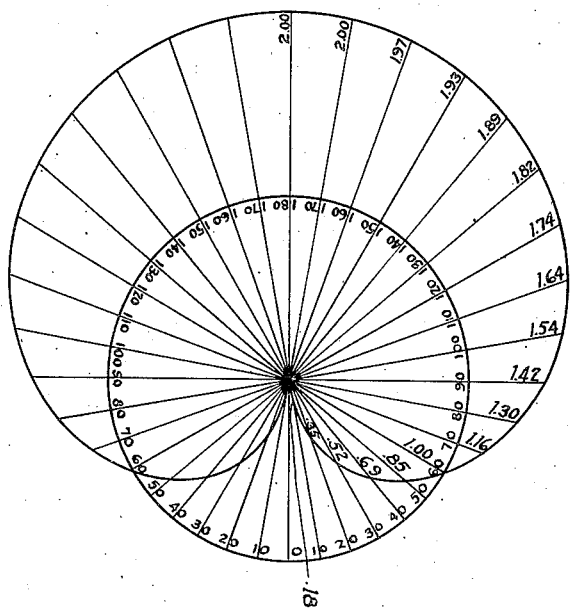
Fig.6
INVENTOR
BURT L. NEWKIRK
By Paul & Paul
HIS ATTORNEYS Patented Oct. 13, 1925.

1,557,268

UNITED STATES PATENT OFFICE.

BURT L. NEWKIRK, OF MINNEAPOLIS, MINNESOTA, ASSIGNOR, BY MESNE ASSIGNMENTS, TO PRECISION BALANCING MACHINE COMPANY, OF EAU CLAIRE, WISCONSIN, A CORPORATION OF WISCONSIN.

PROCESS OF AND APPARATUS FOR BALANCING ROTATIVE BODIES.

Application filed July 23, 1920. Serial No. 398,564.

*To all whom it may concern:*

Be it known that I, BURT L. NEWKIRK, a citizen of the United States, residing at Minneapolis, county of Hennepin, and State of Minnesota, have invented certain new and useful Improvements in Processes of and Apparatus for Balancing Rotative Bodies, of which the following is a specification.

The invention relates to a process for the detection of dynamic unbalance in rotative bodies, and for the accurate and rapid determination of the amount and the position of the unbalanced weight in a dynamically unbalanced rotative body, and for the simultaneous correction of static unbalance in such body.

This novel process also provides for the determination of resultant unbalance in two selected planes situated at right angles to the axis of rotation, without an unbalance in one plane affecting the unbalance in the other. Therefore, in quantity production of machine parts to be balanced, for example, the corrective data regarding the unbalance in the work can be marked and the corrective operation later carried out.

In carrying out this process a novel apparatus is employed and, included in this process, is a process for the calibration of the apparatus, the provision of a process chart indicative of the proper positioning of the corrective weight, and the provision of another process chart determinative of unbalance corrections when all factors contributive to the unbalance are unknown.

When the expression unbalance in one plane is employed, it is to be understood to mean that condition of unbalance of the body which can be corrected by removal or addition of material in that plane.

It is generally understood that a rotative body, when in unbalanced condition, sets up vibrations in its supporting means; and also that each supporting means has a natural and inherent vibration frequency under a given weight and distribution of mass; and, further, it is generally supposed that when the frequency of the vibrations or oscillations induced by the unbalanced rotative body is in synchronism with the natural vibration frequency of its associated supporting means, which condition is designated as "critical speed," the maximum amplitude of vibration or oscillation of the supporting means is attained.

A present known method of employing this physical phenomenon is to rotate a body at constant speed in a frame mounted so that its oscillation is controlled by springs. These springs are changed until a spring is found which has a natural period of vibration which responds to the particular speed of rotation of the body.

Besides being difficult to maintain the rotative body at uniform and exact speed, another inherent disadvantage of the present processes or methods wherein the rotative body is made to run at a constant rate at or near the critical speed and the amount of unbalance roughly estimated from oscillation, is that such processes are uncertain and tedious in application because of the practical difficulty of maintaining constant speed of rotation of the body, and of bringing the body back again to the identical constant speed after stoppage to add corrective weights. In this connection, it is to be noted that slight variations in the speed of the body, when the body is revolving at or near the critical speed result in great variations in the oscillation of the frame. A variation of this known method is to rotate the body at varying speed by increasing or decreasing the driving power so that the critical speed is passed through both increasing and decreasing, but without means to control closely the rate of passing through critical speed to make such rate repeatable, and without sufficient care to eliminate damping effects that influence the vibration of the supporting means. Under such circumstances the amplitude of vibration of the supporting means is a rough indication only of the amount of unbalance and such indication can serve only as a basis for cut and try methods and it cannot form the basis of the precise and systematic process which I have developed. The ordinary methods offer therefore, no means of measuring with certainty and precision the amount of unbalance of the body and, consequently, the operator must proceed by a prolonged succession of trials which become increasingly uncertain as the body, by successive corrections, becomes more nearly balanced. These disadvantages are all overcome by the employment of this novel process. This process is systematic and gives an accurate measure of the unbalance of a rotative body. Where extreme refinement is necessary this can be accomplished with certainty by a repetition of the process without excessive expenditure of time.

Other objects of the invention will more fully appear from the following description and the accompanying drawings and will be pointed out in the annexed claims.

The accompanying drawings diagrammatically disclose a structure designed to carry out the objects of the invention, but it is to be understood that the invention is not confined to the exact features shown, as various changes may be made within the scope of the claims which follow.

In the drawings:

Figure 4 is a plotted data showing the relation between maximum amplitude of vibration and amount of unbalance;

Figure 5 is a similarly plotted data on a scale one-tenth that of Figure 4 with weights ten times as great;

Figure 6 is a process chart for the determination of proper relative angular positions of corrections;

Figure 1:
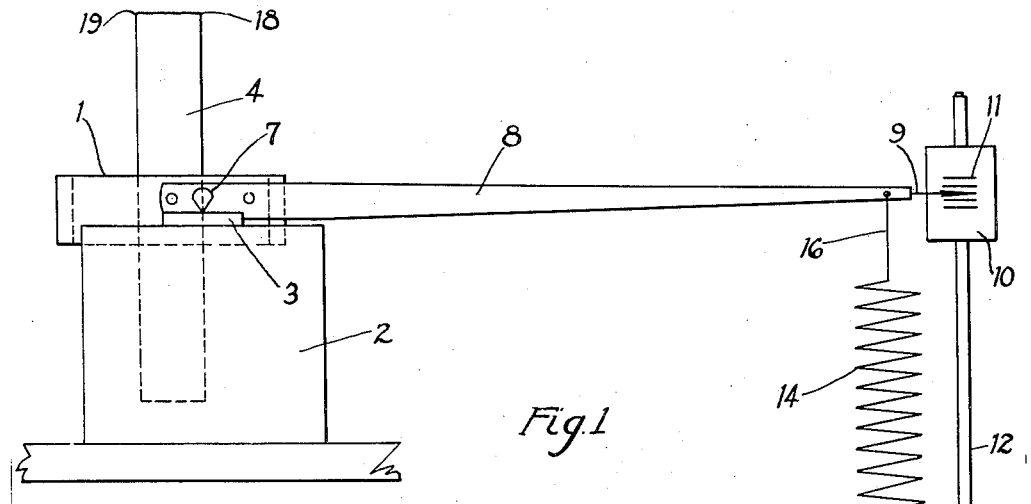
Figure 1 is a diagrammatic view in side elevation of the novel apparatus.
Figure 2:
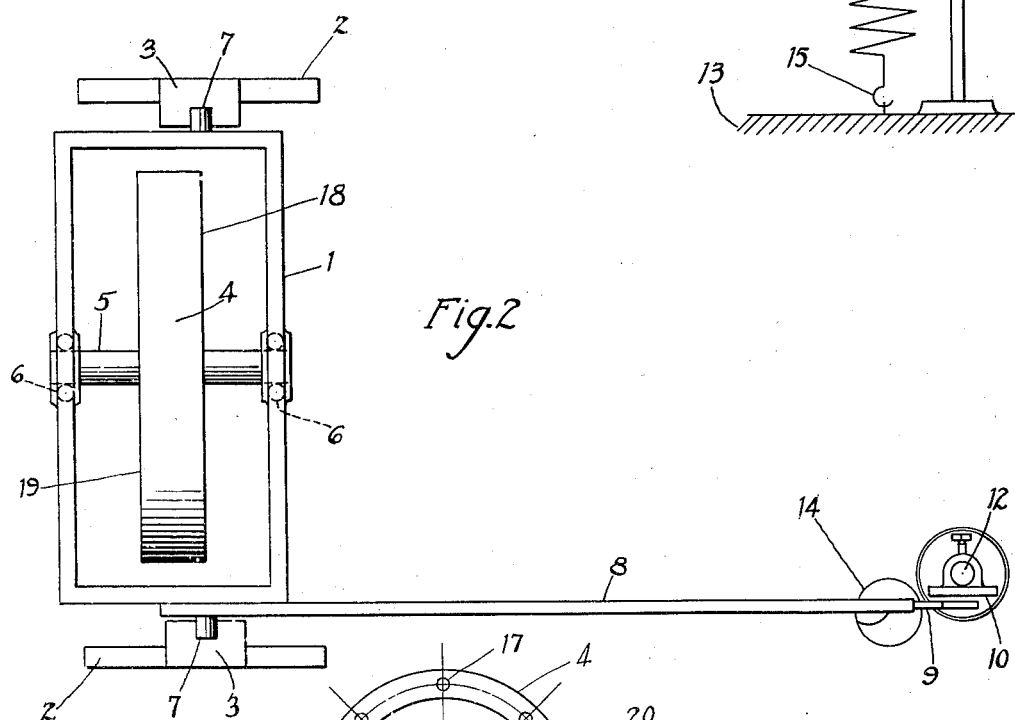
Figure 2 is a similar view in plan.

This novel process employs the beforementioned physical phenomena in conjunction with the discovery of the inventor hereof that the maximum amplitude of vibration that occurs as the rotating body passes through the critical speed, (either by a passage from above to below the critical speed, or vice versa), is accurately proportional to the correction necessary to place the unbalanced body in dynamic balance, when rate of passage through the critical speed is definitely controlled and repeatable, but not unless so controlled. The absence of such control is one of the chief reasons why consistent results are not obtainable with other appliances used in the past, and for the discovery made by applicant that under proper conditions there is a direct proportionality between the maximum amplitude of oscillation and the amount of unbalance. It is necessary also to the success of this process that damping resistance to vibration of the supporting means be reduced to a relatively low value, otherwise the proportionality between the amount of unbalance to be determined and the amplitude of vibration does not exist. Failure to accomplish this reduction of damping forces is another reason why such amplitude measures as have been made heretofore cannot serve as a basis for a systematic process such as I have devised.

The maximum amplitude of vibration that occurs as the rotating body passes through the critical speed, does not necessarily occur at the exact instant of synchronism between the period of rotation of the body and the period of free oscillation, but it does occur in the neighborhood of this condition of synchronism and near the time when this condition is passed through. This maximum amplitude undoubtedly occurs shortly after the instant of passing through critical speed and that it may be an accurate measure of the unbalance of the rotating body, it is necessary that critical speed be passed through at a certain, definite, slowly reducing or increasing rate.

When care is taken to cause the critical speed to be passed through at a definite rate and to reduce the damping resistance to a relatively low value, the correspondence between this maximum amplitude of vibration and the amount of unbalance is very accurate as is demonstrated in Figures 4 and 5. In these figures, the abscissas indicate the amount of unbalance of a rotating body in grammes, the ordinates indicate the maximum amplitude in scale divisions as the rotating body passes through critical speed. The proof that the maximum amplitude is proportional to the amount of unbalance lies in the fact that the points representing these observations lie on a straight line which passes through the origin. Figure 4 shows this correspondence when the amount of unbalance is very small and Figure 5 shows the ratio between the maximum amplitude and the amount of unbalance as the same when unbalance is of considerable magnitude. The amount of the angle through which the known weight should be moved. The very close agreement in the slopes of these two lines proves this proportionality between the maximum amplitude of oscillation and the unbalance to be quite accurate. However, since individual observations show some slight differences, it is advisable when extreme accuracy is desired not to trust to a single observation but to cause the rotor to drift down through resonant speed two or three times, observing the maximum amplitude of oscillation each time, and then combine the observations by taking the average of the measured values.

The general manner in which this novel principle may be availed of is, to rotatably mount the body to be tested in bearings having a minimum of friction on a freely working or swinging supporting means. The oscillatory movement of the supporting means is preferably against spring tension. Desirably this body is mounted on a supporting means which remains unchanged during the test, not only of a given body, but also during the successive determinations of all bodies of the same shape and dimensions, as, for example, during the run of a lot of the same quantity production. In such procedure, the critical speed is attained by having the body freely rotating in its support and by giving it an initial rotative rate in excess of the predetermined natural oscillatory frequency of the particular set-up supporting means under the load of the body, or of one similar thereto. This procedure, no force being applied other than the natural slight frictional retardation of the rotative rate of the body, causes its rotative rate to slowly, steadily, and uniformly pass through the oscillatory rate of the supporting means. The given apparatus may be calibrated so that each one of a quantity of bodies of the same kind, such as is included in the quantity production of flywheels, crankshafts, rotors, etc., may be rapidly and accurately treated by this process, and the lack of balance in the body not only may be quickly detected, but also, by reference to a constant, the amount of the necessary corrective weight may be rapidly and accurately ascertained. Further, the rapid ascertainment of the point on the rotative unbalanced body at which such corrective weight must be affixed can be had. An additional advantage of this novel process resides in the fact that a slight unbalance in a rotative body may be measured while the body is rotated at a relatively low rate of speed. For example, the supporting means may be so arranged that its natural vibration frequency is seventy-five or one hundred vibrations per minute, which readily permits an accurate visual determination of the maximum amplitude of the vibration or oscillation induced by the rotative body.

Any resilient support such as is commonly used in balancing machines and possessing certain natural frequency of vibration when acted upon by a periodic force of varying frequency, such as is produced by an unbalanced body rotating thereon, will re-act in accordance with the periodic force to a markedly greater extent when the frequency of the periodic force is equal to the natural frequency of the system comprising the body and its support. This marked increase of vibration is called "resonance" and the speed of the body at which maximum vibration would occur if the speed were constant is the critical speed as herein defined. When a body of relatively large amount of inertia revolves freely upon anti-friction bearings, such as ball bearings of refined construction which are maintained in a constant state of lubrication, the rate of retardation due to the slight friction of bearings and atmospheric resistance becomes precisely controlled in that it is relatively slow, constant and repeatable. In the apparatus and process involved in my invention, the resiliently pivoted supporting means are relatively free from damping resistance to vibration. If the body is set into rotation at a higher speed than the critical speed while said supporting means is locked at the central or neutral point of pivotal vibration, and if said lock is released without jar or disturbance other than the unbalance of the revolving body when the speed of rotation is only slightly above the critical speed, there will occur a phenomenon of beats, due to the small difference between the period of rotation and the period of free vibration. The largest amplitude of vibration which occurs during the beat at or following the critical speed is proportionate to the amount of unbalance to be determined in the revolving body, and when so measured constitutes one means of establishing the amplitudes referred to in my process. This characteristic form of vibration occurs only in apparatuses of the form of my invention, and differs fundamentally from the forced or partially resonant vibrations of other apparatuses heretofore used, where the body is revolved at an approximately constant speed or at a roughly varying speed, which cannot be accurately repeated, by the application of power, during the observations of amplitudes, and where appreciable damping forces are present. Such amplitudes are accordingly not proportionate or indicative of the state of unbalance except as repeated experiment may show them to become reduced.

An obvious variation of this process would be to cause the rotating body to pass through critical speed at a uniformly repeatable rate, but without reducing the damping resistance to vibration to a negligible amount. In such case the observed amplitudes of vibration would not be proportional to the unbalance, but certain advantages of systematic procedure would be secured.

It is to be understood that, while reference is herein made to the maximum amplitude of oscillation of the supporting means, reference could as well be made to the maximum velocity of the supporting means and a recordment of same. In other words, at any given rate of oscillation of the frame, the velocity of the frame travel must vary directly as does the oscillatory amplitude or linear distance traveled.

Fundamental, also, in the theory of dynamic balancing, is the fact that complete dynamic balance, including static balance, can be accomplished by correction to the rotative body in two arbitrarily chosen planes at right angles to the axis of rotation.

An important advantage of this process lies in the manner of mounting the rotative body in a frame, or other supports, in such a way that one of the arbitrarily selected planes of the rotative body lies in the axis of oscillatory motion. A single correction for unbalance which is to be made in the other plane is then determined and applied. The rotative body is then shifted on its supports so that the other arbitrarily chosen plane in which a correction is to be applied is no longer in the axis of oscillatory motion. The correction to be applied in this plane is now determined and applied and balance can thus be completed without calculations. Other methods in which the body is not mounted, as explained above, with one of the arbitrarily chosen planes in the axis of oscillation, require computations for the determination of the correction which is actually to be applied.

A still greater advantage arises if the body be mounted for determination of the first correction as just described, with one of the arbitrarily chosen planes in the axis of oscillation, and when the second correction is being determined, the second of the two arbitrarily chosen planes is placed in the axis of oscillation of the rotative body. If this plan is followed, the second correction may be determined without first applying the correction first determined. This is a great advantage in quantity production since corrections may be determined and the bodies marked for subsequent correction without the application of any correction during the process of balancing.

An assemblage or set-up of apparatus adapted to carry out this novel process is shown in the drawings. The supporting means herein consists of a substantially rectangular frame 1 carried by the two uprights or standards 2. A bearing plate 3, preferably metallic, is secured to the upper face of each of the standards. The rotative body, a fly-wheel 4 being here shown for sake of full and clear disclosure, is rotatably borne by the frame. As here diagrammatically indicated, the shaft 5 of the fly-wheel is rotatably mounted in antifriction bearings such as ball-bearings 6 carried by the frame sides. The frame 1 is mounted to rock or oscillate on the standards 2 and in this embodiment of the invention, the frame is provided with knife edges 7. These knife edges are alined, i. e., are in the same vertical plane, and such plane is at right angles to the vertical axial plane of the shaft 5 of the fly-wheel 4. The plane of these knife edges 7 is not in the longitudinal axial plane of the frame in order that the body may be turned around so that a different radial plane of the body may be brought into coincidence with the knife edge plane. This is desirable in order that determinations of unbalance may be made in two planes of the body.

In order that the amplitude of oscillation as well as the rate of oscillation may be readily and accurately ascertained, a relative long arm 8 is rigidly secured to one end member of the frame 1. This arm 8, outwardly projecting from the frame is preferably provided with an indicator such as a pointer 9 which obviously has a greater linear travel, in response to frame oscillations, than any point on the frame. This pointer 9 is adapted to travel closely adjacent a scale 10 having a plurality of graduated unit notations thereon. Such notations are here shown as superposed lines 11. This scale 10 is suitably adjustably supported upon a rigid upright 12 positioned upon the floor or other foundation 13 as are the standards 2. A spring, such as a helical spring 14 is mounted with its lower end 15 secured to the foundation 13 and its upper end 16 secured to the arm 9 adjacent the pointer. The spring 14 controls the oscillation of the arm 9 and different springs 14 will variously affect the oscillation of the frame under the same load, hence, different oscillatory rates of the frame may be attained by change of springs 14.

The methods of carrying out this novel process, when employing this selected form of apparatus in which the critical speed is passed through by retardation of a freely rotatable body, will now be described.

Figure 3:
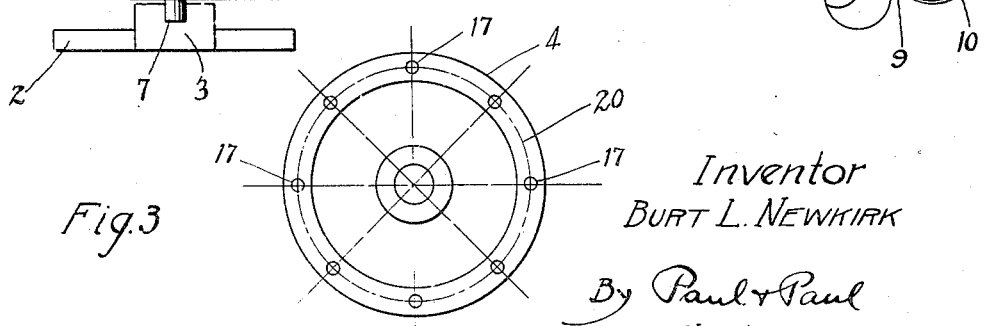
Figure 3 is a diagrammatic view in side elevation of a specimen test body.

The particular set-up or apparatus used is first calibrated for quantity balancing of duplicate parts such, for example, as the fly-wheel 4. A carefully dynamically balanced duplicate of the fly-wheel 4 is drilled for instance with holes 17 (see Figure 3) each of which is at the same radial distance from the axis of the wheel 4. The holes 17 are preferably drilled at definite positions being here shown as forty-five degrees apart. The test wheel 4 is then accurately mounted upon the shaft 5 and the wheel and shaft placed on the frame so that the shaft may rotate in the ball bearings 6 and so that the plane of the vertical edge 18 of the fly-wheel 4 is in alinement with the plane of the knife edges 7 constituting the fulcrum of the frame. The frame, carrying this wheel may be manually rocked and the natural rate of free oscillation of the apparatus noted. It should be noted that it is preferable to set up the apparatus so that a low rate of natural oscillation is secured, such, for example, as a rate of one hundred oscillations per minute.

If the wheel be in dynamic balance, the arm 9, held still at center position and then let free, will not oscillate when the wheel is rotated in the frame. The scale 10 is then adjusted and fixed on the upright 12 so that the median line of the markings, i. e., the zero mark is in line with the terminal of the pointer 11. An arbitrary amount of weight is then added in plane 19 by inserting it in any one of the holes 17. The wheel 4 is then rotated slightly faster than the predetermined oscillatory rate of the frame, for example, about one hundred and ten revolutions per minute. The wheel 4 is then permitted freely to rotate and the slight frictional retardation only causes a constant and uniform speed reduction so that the critical speed is very slowly passed through. This gives full opportunity for the amplitude of swing or oscillation of the frame to be built up and its exact maximum to be noted by the observer with reference to the scale 10 as the critical speed is being passed.

Further, as heretofore noted, it has been discovered by the inventor hereof, that the maximum amplitude of swing measured at the end of the arm 8 and the amount of unbalance of the body tested, are proportional, therefore, by noting the greatest amplitude in divisions of the scale 11 and then dividing the known weight used by the amplitude, the amount of correction per unit of scale division is known and the apparatus is calibrated and the proportional constant for this particular apparatus for this particular series of relative bodies is established.

It is evident that this passage through critical speed can be accomplished also by other means. For example, the wheel might be run at constant speed and the period of free oscillation changed or passed through the speed of rotation. This can be done by varying the effective length of the spring 14 or varying the moment of inertia of the frame 1 through the movement of a weight thereon.

The apparatus being calibrated, the further steps of the process are as follows: The test duplicate wheel is removed and one of the unbalanced duplicates of the flywheel, such as the fly-wheel 4, is placed in the frame so that the plane of the vertical edge 18 of the wheel is in exact alinement with the plane of the knife edge 7. The unbalanced wheel 4 is then freely rotated in the same manner as was the test duplicate. The maximum amplitude on the scale 10 is observed and noted. The ratio or proportional constant (above described) multiplied by the maximum amplitude will give the amount of correction to place in the plane 19 of the unbalanced wheel.

The required amount of weight being determined, this weight is then placed in any point in the circle 20 scribed on the end surface of the wheel in this plane 19. Such circle is employed as it may be necessary to shift the weight and it is necessary to preserve the same radial distance from the axis of the test wheel. Upon positioning of the known weight, the wheel is again freely rotated as before and reduction of speed permits passage through critical speed again. The maximum amplitude is again noted. From the relation between these two maximum amplitude readings, it is possible to determine the amount of the angle through which the known weight should be moved. The direction in which this angle should be measured is then determined by shifting the weight through the required angle in either direction and rotating the wheel again to determine whether it is or is not in balance; that is, whether the weight was shifted in the right direction or in the wrong one. In either case, this third rotation of the wheel determines the direction in which the angle should be measured. The relations between various maximum amplitude readings have been plotted by the inventor hereof and are shown in the process chart disclosed in Figure 6. The ratio between the second amplitude and the first amplitude will, by reference to the mathematically calculated process chart, give in degrees the angular error of weight positioning on the scribed circle. The corrective weight is then accordingly fixed or marked.

The novel reference process chart (Figure 6) for the determination of proper relative angular positions of corrections has been developed as follows: The circle showing angular positions in degrees is drawn and degrees spaced and marked thereon as shown. With true point at zero degrees, the resultant forces have been figured and plotted from consideration of two equal unit forces acting at same radius at different angles apart. The forces are opposite and equal at zero degrees and balanced, and they pull in same direction at 180 degrees and unbalance is doubled. This is a graphic representation of what is done in balancing a rotative body when, after proper correction has been determined, it is applied at different angular positions on said body. The plotting of said resultant forces upon the different angle lines results in the outside trigonometric curve of the chart which is a function of the included angle;—also, as calculated from unit forces it can be used proportionally. As maximum amplitude of the arm 8 is accurately proportional to amount of unbalance, it is clear that the amplitude before correction was applied taken as the amplitude unit and the ratio of the second amplitude to same taken after correction was applied and referred to the process chart, will give the included angle for properly positioning the correction. This process chart system could be exemplified in other ways as for instance, other diagrams, or measuring dials, or instruments.

The next step in the process consists in taking the wheel 4 out of the frame, turning and restoring it to the frame so that its shaft ends are interchanged, so that, for example, the other vertical plane of the edge 19 of the wheel is in the vertical plane of the knife-edges 7. The same procedure is repeated. The wheel is then rotated, the maximum amplitude noted, weight determined, and position ascertained and correction marked or applied on that face of the wheel which does not contain the knife edge. The wheel 4 is then corrected for both static and dynamic balance. When it is not convenient to place edge 19 into alinement with fulcrums 7, the correction in plane 19 must be fixed to body and then plane 18 moved into convenient position out of alinement with fulcrums 7 while measuring unbalance in plane 18.

When nothing definite about particular body to be balanced is known, nor the apparatus calibrated, the alternate or second process, which is a form of previous process is as follows:

Two planes of the body are selected for correction and the body or wheel 4 is mounted in the same apparatus in the same way as before described with one of said planes in alinement with the axis of the pivots or fulcrums 7. The body is then rotated and the maximum amplitude of frame oscillation, the same as before described, noted as it passes through critical speed. The result is laid out graphically on a system or process diagram as in Figures 7, 8 and 9. The abscissae represent the angles at which correction has been applied and the ordinates corresponding amplitudes. Some definite correction is now applied to the body or wheel in the other plane selected for correction at a definite point in a definite circle as for instance the circle 20, the body rotated and the resulting maximum amplitude observed same as before. The correction is then removed and then applied to other quadrant or known points on same circle 20, and the body rotated, maximum amplitude etc. noted in each instance and the results plotted and marked on system diagram Figure 7, and a curve drawn joining them as shown. The minimum of the curve locates the point where correction is to be applied. The distance A represents the amplitude after the correction is applied and the distance B the amplitude before the correction is applied. The quotient of distance A divided by the weight of the correction is the proportional constant. If the correction is smaller than amount required for balance, the horizontal line representing the no-correction amplitude lies midway between the maximum and minimum of the curve. If the correction is greater than required, the straight line lies below the middle, the proportional constant is used to compute the amount to be added to, or substracted from the trial correction to produce balance.

When this process is gone through with and correction applied in one selected plane, it is then repeated in the same way with other selected plane as described before, the body or wheel is then either permanently corrected or marked for complete correction for dynamic and static balance.

It will be noted that by moving the definite correction near the positions shown to be that of maximum amplitude, the total amount of amplitude extra, or above the amplitude before applying correction can be readily determined.

Figure 7:
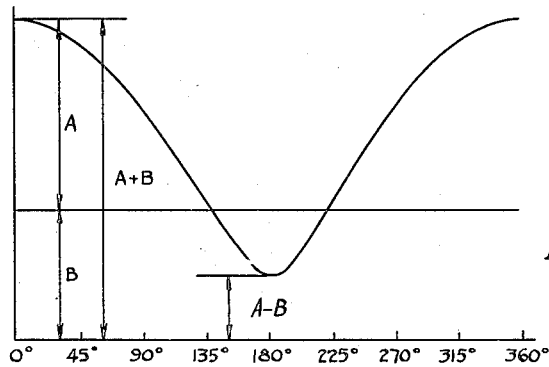
Figures 7, 8 and 9 are plotted results of data obtained during three successive operations of the apparatus, as, for example, when all factors contributive to the unbalance are unknown.
Figure 8:
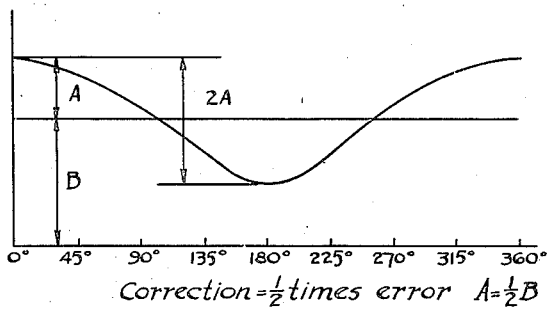
Figure 9:
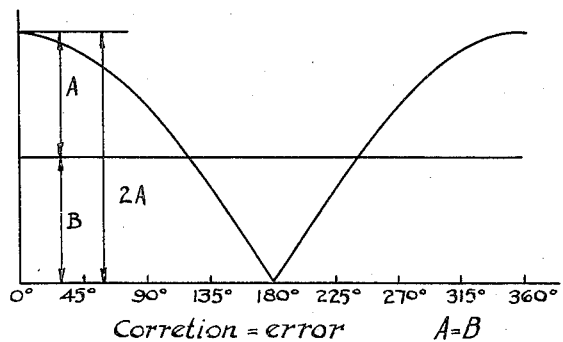

It is also evident that by moving said corrective weight to points required around the circle, the maximum and minimum amplitudes can be ascertain without laying out results graphically as in Figures 7, 8 and 9, and the amplitude A due to the correction applied can be ascertained numerically from which the proportional constant is derived as before.

Of fundamental importance in this second process, where nothing definite about the particular body is known, is the interpretation of observed oscillation or vibrations taken with a given weight applied at varying angles, as shown in Figures 7, 8 and 9. It is obvious that plats, diagrams or charts of this character or their equivalents, or equivalent numerical values, would be equally applicable to any form of apparatus in which proportionality of vibration to the amount of unbalance is obtained, and that the use of the principles hereby disclosed in such manner would not depart from the fundamentals of this invention.

I claim as my invention:

1. In the process of balancing a rotative body, the step which consists in rotating the body upon a resilient support at a varying speed that is uniformly repeatable and that passes the critical speed and determining and measuring the maximum amplitude of oscillation of said support.

2. In the process of balancing rotative bodies, the step which consists in rotating the body upon a resilient support which offers negligible damping resistance to vibration and at a varying speed that is uniformly repeatable, and that passes the critical speed, and determining and measuring the maximum amplitude of oscillation of said support.

3. In the process of balancing rotative bodies, the step which consists in rotating the body upon a resilient support at a decreasing speed that is uniformly repeatable and that passes the critical speed, and determining and measuring the maximum amplitude of oscillation of said support.

4. In the process of balancing rotative bodies, the step which consists in rotating the body upon a resilient support which offers negligible damping resistance to vibration at a decreasing speed that is uniformly repeatable and that passes the critical speed, and determining and measuring the maximum amplitude of oscillation of said support.

5. In the process of balancing rotative bodies, the step which consists in determining the amount of unbalance of the body by causing the same to rotate upon a resilient support at a varying speed that is uniformly repeatable and that passes critical speed, and determining and measuring the maximum amplitude of oscillation of said support.

6. In the process of balancing rotative bodies, the step which consists in determining the amount of unbalance of the body by causing the same to rotate upon a resilient support which offers negligible damping resistance to vibration, at a varying speed that is uniformly repeatable and that passes critical speed, and determining and measuring the maximum amplitude of oscillation of said support.

7. The process of balancing rotative bodies, which consists in placing the body in a swinging support having fulcrums at right angles to the axis of rotation of the body, rotating the body upon said support at a decreasing speed that is uniformly repeatable and that passes critical speed, determining and measuring the maximum amplitude of oscillation, and determining therefrom the corrections necessary to balance the body.

8. The process of balancing rotative bodies which consists in mounting the body with elastic restraint in pivotal supports at right angles to axis of rotation of body; the rotating of the body above the point of synchronism between the rotation of the body and the oscillation of supports and body, and the measurement of amount of unbalance by the measurement of the maximum oscillation of supports and body, while speed of rotation of body is being continuously reduced.

9. The process of balancing a rotative body which consists in rotating the body upon a resilient support at a varying speed that is uniformly repeatable, to ascertain the amount of unbalance, selecting a try-out point of application of correction of the ascertained amount and then determining the angle between the trial point of application of correction of the amount and the point where correction should be applied.

10. The process of balancing a rotative body which consists in rotating the body upon a resilient support which offers negligible damping resistance to vibration at a varying speed that is uniformly repeatable, to ascertain the amount of unbalance, selecting a trial point of application of correction of the ascertained amount and then determining the angle between the trial point of application of correction of the amount and the point where correction should be applied.

11. The process of balancing a rotative body which consists in rotating the body upon a resilient support at a decreasing speed that is uniformly repeatable, to ascertain the amount of unbalance, selecting a trial point of application of correction of the ascertained amount and then determining the angle between the trial point of application of correction of the amount and the point where correction should be applied.

12. In a process of balancing rotative bodies, the step which consists in determining the angle between the point of application of a correction and the point where said correction is required by comparison of the first determined correction with the amount of correction then determined, and reference to the mathematical resultant of two forces at different angles with each other.

13. In a process of balancing rotative bodies, the step which consists in determining the angle between the point of application of a correction and the point where said correction is required by comparison of amplitudes, and reference to the mathematical resultant of two forces at different angles with each other.

14. A process of balancing rotative bodies which consists in correcting the body in two selected planes at right angles to its axis of rotation, by rotatably mounting the body in a fulcrumed frame; supporting the frame on fulcrums at right angles to the axis of rotation of the body, the fulcrums being placed in one of said selected planes; measuring the amount and position of correction required in the other selected plane; then causing said fulcrums to be in said other selected plane; then measuring the amount and position of correction required in said first selected plane while thus out of the plane of the supporting fulcrums.

15. A process of balancing rotative bodies which consists in correcting the body in two selected planes at right angles to its axis of rotation, by rotatably mounting the body in a frame pivotally supported in one of said selective planes; measuring and locating the correction required in the other selected plane; causing a pivotal support to be in said other selected plane; measuring and locating the correction required in said first selected plane.

16. A process of balancing rotative bodies, which consists in correcting the body in two selected planes at right angles to its axis of rotation by rotatably mounting the body on supporting means; swinging said supporting means on fulcrum points at right angles to the axis of rotation of the body, the fulcrum points being placed in one of said selected planes of the body; then rotating the body; then measuring and locating the correction required in the other of said selected planes then applying correction; then moving the body so that said points are out of the first selected plane; then rotating the body, and finally measuring and locating the correction required in the first selected plane.

17. A process of balancing rotative bodies which consists in correcting the body in two selected planes at right angles to its axis of rotation by rotatably mounting the body on supporting means pivotally in one of said selected planes; rotating the body, measuring and locating the correction required in the other of said selected planes; applying the correction; causing a pivoting point to be out of the first selected plane; rotating the body, measuring and locating the correction required in said first selected plane.

18. The process of balancing rotative bodies which consists in placing the body on a swinging support pivoted in alinement with one selected plane of the body and at right angles to the axis of rotation of the body; rotating the body; measuring and locating the correction required in another selected plane; then moving the body so that the second selected plane is in alinement with said pivot or pivots; rotating the body; and finally measuring and locating the correction required in the first plane.

19. The process of balancing rotative bodies which consists in correcting the body in two selected planes at right angles to its axis of rotation; placing the body in supports pivoted at right angles to the axis of rotation of the body and in one of said selected planes; rotating the body; measuring the amount and position of correction required in the other selected plane; applying the correction; moving the body in the supports so said pivot or pivots are out of said first selected plane; rotating the body; and finally measuring the amount and position of correction required in said first selected plane.

20. The process of balancing rotative bodies which consists in placing the body in supporting means; mounting said supporting means on pivots at right angles to the axis of rotation of the body and in one of two selected planes of the body; rotating the body; measuring the amount and position of correction required in the other of said selected planes; applying the correction; moving the body in said supporting means so that the pivots are out of said first selected plane; rotating the body; and finally measuring the amount and position of correction required in said first selected plane.

21. The process of balancing rotative bodies which consists in mounting a body on a shaft; rotatably mounting the shaft in anti-friction bearings supported by a frame swinging upon fulcrums at right angles to the axis of rotation of the body and with the fulcrums in one plane of said body; rotating the body to cause it to pass through critical speed; measuring the maximum amount of oscillation of the frame while passing through critical speed; determining and applying the required correction; moving the body so that the fulcrums are in a plane of said body other than first-mentioned plane; rotating the body to cause it to pass through critical speed; measuring the maximum amount of oscillation of the frame while passing through critical speed; and finally determining and applying the correction in said first-mentioned plane putting body in complete static and dynamic balance.

22. In the process of balancing a rotative body, the step that consists in rotating the body upon a support and at a varying speed that is uniformly repeatable and that passes critical speed, observing the maximum amplitude of vibration, and determining therefrom, through the described law of proportionality between amplitude of vibration and unbalance, the unbalance of the body.

23. In the process of balancing a rotative body, the step that consists in rotating the body upon a support and at a varying speed that is uniformly repeatable and that passes critical speed, and determining, by application of the described law of proportionality between amplitude of vibration and unbalance, the unbalance of the body.

24. In the process of balancing a rotative body, the step that consists in rotating the body upon a support at a varying speed that is uniformly repeatable and that passes critical speed, and determining the unbalance of the body by observing the maximum amplitude of vibration and comparing the same with a fixed scale disclosing the proportionality between maximum vibration and unbalance.

25. In a process of balancing rotative bodies, calibrating the apparatus by revolving a body carrying a known weight in a known plane at a known radius from the axis of rotation, measuring the maximum amplitude of oscillation of apparatus and body while passing from above to below critical speed, while the body is being rotated upon a support at a varying speed that is uniformly repeatable and determining the relation between a unit of maximum amplitude and a unit of known weight.

26. In the process of balancing rotative bodies, measuring the amplitude of oscillation of the body, while the body is being rotated upon a support and passing through critical speed at a rate that is uniformly repeatable, and determining by repeated trials and by reference to the mathematical resultants of two forces at different angles, the amount and position of correction necessary to place the body in balance.

27. In the process of balancing rotative bodies, measuring the amplitude of oscillation of the body, while the body is being rotated upon a support which offers negligible damping resistance to vibration, and while the body is passing through critical speed at a rate that is uniformly repeatable, and determining by repeated trials, and by reference to the mathematical resultants of two forces at different angles, the amount and position of the correction necessary to place the body in balance.

28. The process of balancing rotative bodies, which consists in calibrating the apparatus as to proportionality between amplitude of vibration and amount of unbalance, determining from said calibration the amount of unbalance in a previously untested body, and the amount to be added to the body to correct said unbalance, and then determining the position in said body at which said correction must be made.

29. In a balancing device, the combination of a frame, pivotally mounted to vibrate, means for entirely supporting a body rotatably in a plurality of bearings on said frame, the frame, pivots and the supporting means being arranged so that two different planes of the body, substantially at right angles to its axis of rotation, may successively lie in the perpendicular axial plane of said pivots, and means to control the period of vibration of the frame.

30. In a balancing device, the combination of a frame, means rotatably to mount a body in the frame in a plurality of bearings, so that said body is entirely supported by said frame, the frame being pivotally mounted to oscillate so that the pivotal axis thereof may be substantially within a radial plane of the rotative body selected for application of balance correction.

In witness whereof, I have hereunto set my hand this 28th day of June, 1920.

BURT L. NEWKIRK.